Dec. 1, 1931.    E. E. KELLOGG ET AL    1,834,027
VEHICLE WHEEL
Filed June 15, 1929    3 Sheets-Sheet 1

INVENTORS
Edward E. Kellogg
& Albert T. Smith
BY
ATTORNEYS.

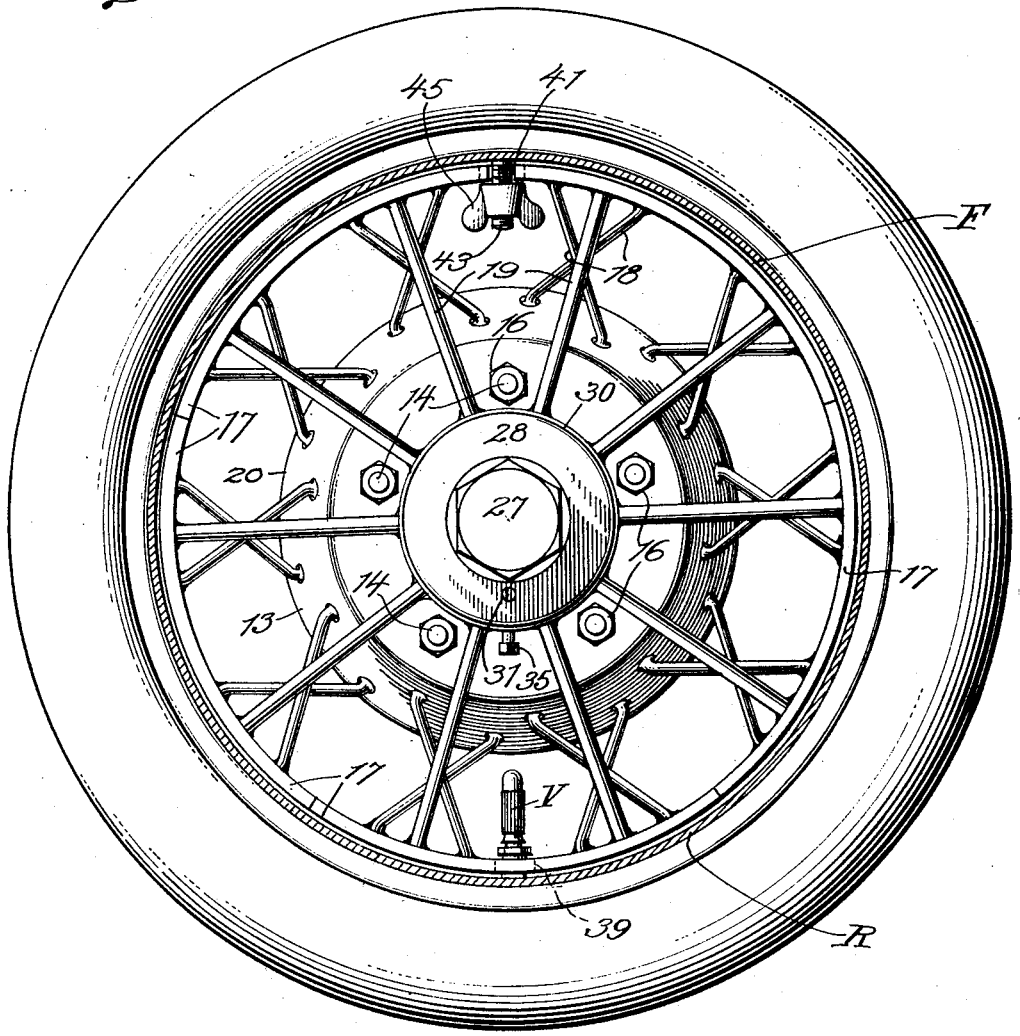

Dec. 1, 1931.  E. E. KELLOGG ET AL  1,834,027
VEHICLE WHEEL
Filed June 15, 1929    3 Sheets-Sheet 3
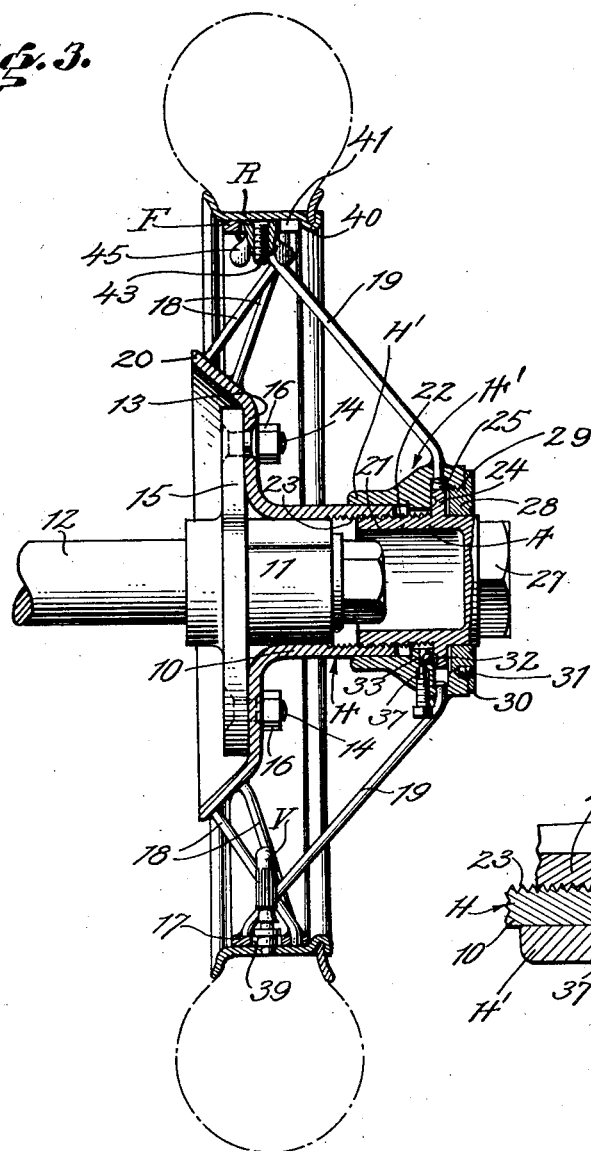
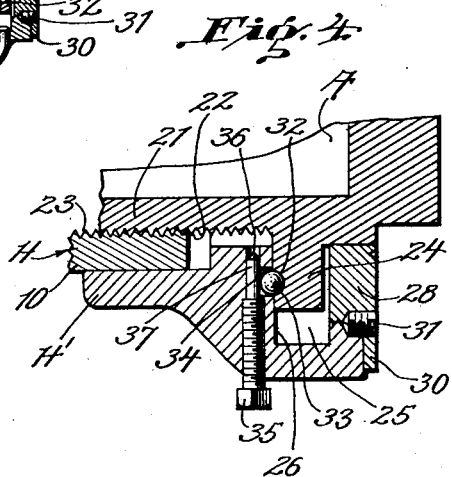
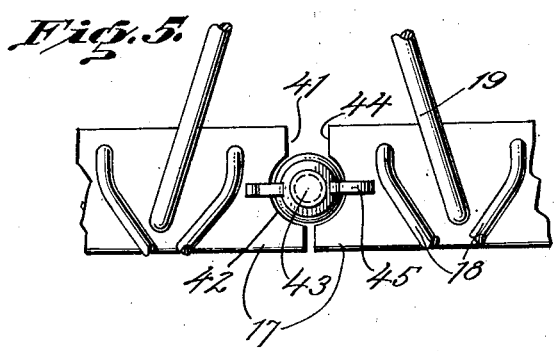
INVENTORS
Edward E. Kellogg
& Albert T. Smith
BY  Munn & Co
ATTORNEYS.

Patented Dec. 1, 1931

1,834,027

UNITED STATES PATENT OFFICE

EDWARD E. KELLOGG, OF NORWALK, AND ALBERT T. SMITH, OF EAGLE ROCK, CALIFORNIA

VEHICLE WHEEL

Application filed June 15, 1929. Serial No. 371,178.

Our invention relates generally to wheels and more particularly to wheels of the character used on automobiles.

It is a purpose of our invention to provide a wheel of simple and rugged construction, to which a conventional tire carrying rim can be applied and firmly secured, or removed with the utmost ease and dispatch, all in such manner that the necessary operations in applying and removing the rim can be performed by an inexperienced person and with but slight effort.

It is a further purpose of our invention to provide a wheel of the above described character which specifically embodies a felly capable of radial expansion and contraction to accordingly grip or release the tire rim; with a pair of relatively movable hub members, and spokes so connecting the hub members and felly as to expand or contract the felly in response to predetermined relative movement of the hub members by an actuator capable of being manually manipulated from the hub of the wheel by the use of a suitable tool with the utmost ease.

It is another purpose of our invention to provide a wheel in which the felly can be positively locked in its expanded position as well as the tire rim held against displacement from the wheel in the event that the felly should accidentally contract and release the rim, or the operator fail to expand the felly sufficiently to positively grip the rim.

We will describe only one form of vehicle wheel embodying our invention and will then point out the novel features thereof in claim.

In the accompanying drawings,

Fig. 2 is a view similar to Figure 1 and illustrating the tire rim released from the wheel for the removal of the rim therefrom.

Fig. 3 is a sectional view taken on the line 3—3 of Figure 1 and looking in the direction of the arrows.

Fig. 4 is an enlarged fragmentary sectional view illustrating a locking device embodied in the wheel, and Fig. 5 is an enlarged fragmentary sectional view taken on the line 5—5 of Figure 1 and looking in the direction of the arrows.

Figure 1:
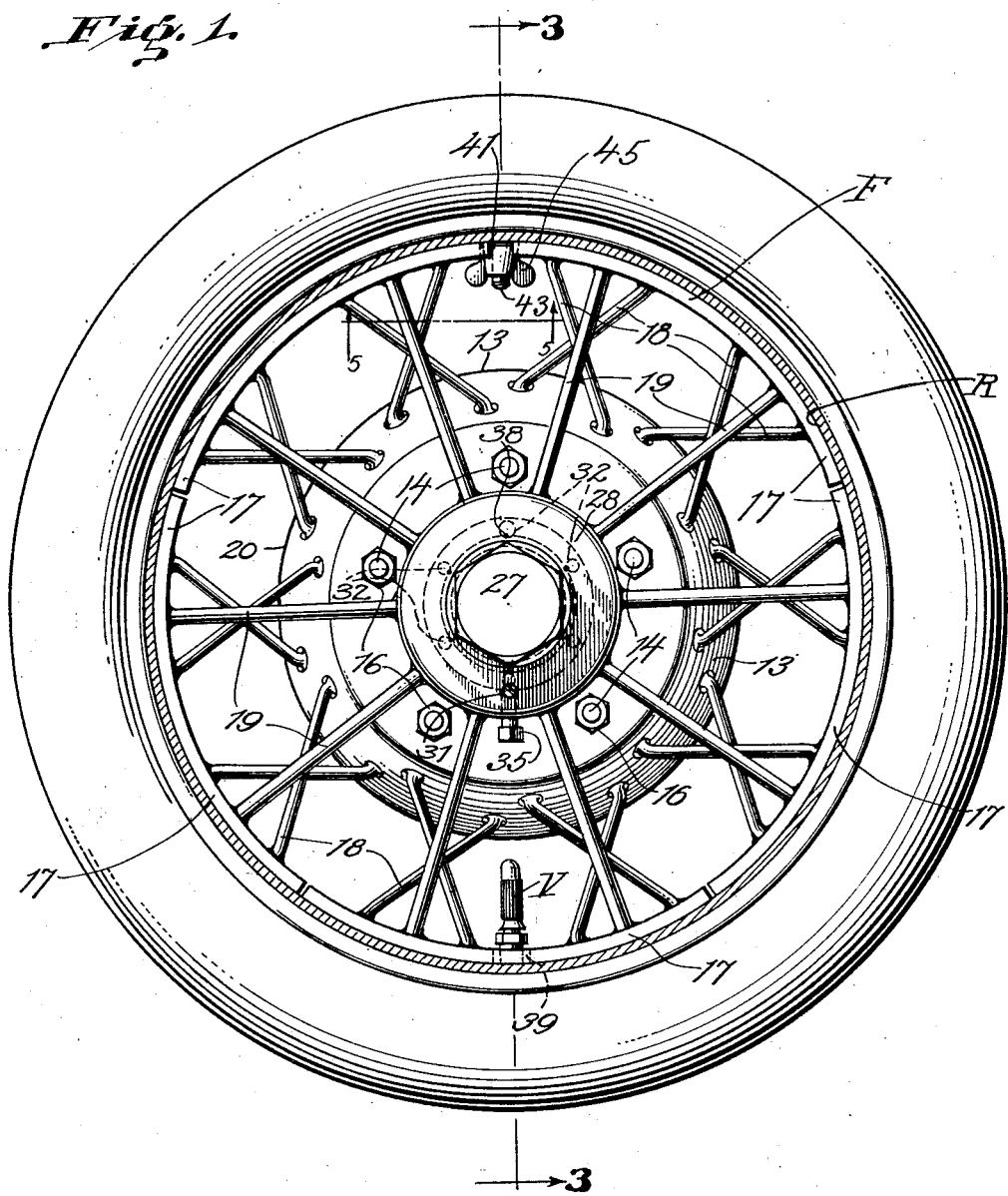
Fig. 1 is a view showing in side elevation one form of vehicle wheel embodying our invention with a tire carrying rim secured on the wheel for use.

Referring specifically to the drawings in which similar reference characters designate similar parts in each of the several views, our invention in its present embodiment comprises a pair of hub members H and H', the member H having a tubular portion 10 freely receiving a standard hub 11 keyed to a driving axle 12 or serving as a housing for the bearing of a steering axle. From the portion 10 extends a circular flange 13 having a circular series of openings receiving threaded studs 14 carried by a flange 15 formed on the standard hub 11. Nuts 16 are threaded on the studs 14 to rigidly secure the hub member H to the standard hub 11. The hub members H and H' are telescopically associated in the present instance, and the hub member H' receives the tubular portion 10 so as to be slidable thereon and thus render the hub members relatively movable towards and away from each other. Specifically the hub member H is fixed, as in use it is of course rigidly secured to the standard hub 11 whereas the hub member H' is movable with respect to the hub member H.

An expansible felly designated generally at F is supported from the hub members H and H', and in the present instance the felly is constructed to provide a plurality of arcuate shaped strips of metal constituting felly sections 17 of which five are illustrated and are supported in felly formation from the hub members H and H' to form a substantially continuous band, by means of two series of flexible solid wire or tubular metal spokes 18 and 19 respectively.

The spokes of the series 18 are arranged in pairs with the spokes of each pair in crossed relation as shown in Figures 1 and 2; and in the present instance two pairs of the spokes 18 are provided for each felly section 17 and are received at their ends in suitable openings formed in the latter and in the inclined marginal edge portion 20 of the hub member H, and welded or otherwise permanently secured in the openings. The spokes 18 are tangentially disposed with respect to the axle 12 as viewed in Figures 1 and 2 and extend at an incline to the plane of the felly F as viewed in Figure 3. The spokes of the series 19 of which two are provided for each felly section 17 in the present instance, are radially disposed with respect to the axle 12 and are received at their outer ends in suitable openings formed in the felly sections intermediate each pair of the spokes 18, and at their inner ends in suitable openings formed in the hub member H', the spokes 19 being welded or otherwise permanently secured in the openings.

As viewed in Figure 3 the spokes 19 are oppositely inclined to the spokes 18 and at a substantial incline to the plane of the felly, and it will be clear that by this arrangement of spokes, sliding movement of the hub member H' towards the hub member H will reduce the inclinations of the spokes 18 and 19 relatively to each other and thus cause the spokes to co-act in forcing the felly sections 17 radially outward to an expanded position as shown in Figure 1, whereas the reverse movement of the hub member H' will increase the inclinations of the spokes 18 and 19 relatively to each other to cause the spokes to draw the felly sections radially inward to a contracted position as shown in Figure 2. During the expanding and contracting operations it will be clear that the flexibility of the spokes 18 and 19 will permit these variations in their relative inclinations without fracturing or injury to their permanent connections with the felly sections and hub members.

In order to actuate the member H', we provide an actuator A in the form of a cup shaped cylindrical body 21 insertable freely through the hub member H' and externally threaded as indicated at 22 for threaded engagement with internal threads 23 formed in the tubular portion 10 of the hub member H. The actuator is provided with a portion in the form of an annular flange 24 intermediate the ends of the body 21, which is freely received in a pocket 25 formed in the hub member H'; the pocket providing an annular shoulder 26 against which one side face of the flange 24 is adapted to abut when the actuator is threaded inwardly of the hub member H. The actuator is provided with an angular wrench receiving head 27 by which the actuator is adapted to be rotated.

A retaining member 28 in the form of a ring, freely receives the hub member H' and has an externally threaded portion 29 threaded into the pocket 25, against which the other side face of the flange 24 is adapted to abut when the actuator is threaded outwardly of the hub member H. The retaining member is further provided with a flange 30 abutting the outer face of the hub member H to definitely limit the extent to which the retaining member can be screwed into the pocket. To lock the retaining member against unscrewing from the hub member H', a set screw 31 is threaded into the retaining member at the threaded connection between the latter and hub member as shown in Figure 4, and to lock the actuator against rotation so as to maintain the felly in its expanded position, the flange 24 is provided with a circular series of pockets 32 into any one of which is adapted to partially project, a latching member in the form of a ball 33 mounted in a bore 34 formed in the hub member H'.

In the inactive position of the ball 33 shown in Figure 3, the ball clears the flange 24 so as to permit unrestricted rotation of the actuator, whereas in the active position of the ball shown in Figure 4 it will be clear that rotation of the actuator will be positively prevented. To maintain the ball in its active position against the tendency of the walls of the pockets 32 to cam the ball to its inactive position, a headed screw 35 is threaded into the hub member H' and is provided with an unthreaded conical extremity 36, which is adapted to cam the ball to its active position so that when the screw 35 is threaded into the hub member to the extent shown in Figure 4 the ball will bear against the unthreaded reduced portion 37 of the screw and will thus be positively maintained in its active position. In order to determine when one of the pockets 32 is alined with the ball 33, an index mark 38 is provided on the outer face of the retaining member 28; and as the pockets 32 correspond in number to and are alined with the apices of the facets of the wrench receiving head 27, it will be clear that it is only necessary to rotate the actuator to aline one of the apices with the index mark 38, to insure that one of the pockets 32 will be alined with the ball for locking of the actuator thereby.

The operation of applying a conventional tire carrying rim R to, and the removal of the rim from the vehicle wheel above described is as follows:

Let it be assumed that the wheel is rigidly secured to the standard hub 11 by means of the studs 15 and nuts 16, and that the actuator A has been rotated to draw the felly F to its contracted position shown in Figure 2. By now inserting the usual valve stem V carried by the tire mounted on the rim R, through an opening 39 formed in one of the felly sections 17 intermediate its ends, the rim is then forced over the felly until the conventional stop flange 40 on the inner periphery of the rim R abuts the felly as shown in Figure 3.

It will be noted that the space between two felly sections 17 at a point diametrically opposite to the opening 39 is sufficient to form a slot 41, opening at one side of the felly and having its inner extremity enlarged as indicated at 42 in Figure 5, whereas the rim R is provided with a threaded stud 43 projecting radially inward so as to pass through the restricted portion 44 of the slot into its enlarged inner extremity when the rim is applied to the felly as in Figure 3. A nut 45 is threaded on the stud 43 and is adapted to seat in the enlarged inner extremity of the slot 41 to co-operate with the valve stem V in a manner to be hereinafter described.

With the rim R applied to the felly as shown in Figure 2, the actuator A is now rotated in the direction to force the hub member H' towards the hub member H, thus causing the spokes 18 and 19 to co-act in forcing the felly sections radially outward against the inner periphery of the rim R as shown in Figures 1 and 3, so that the rim will be firmly held on the wheel by the frictional engagement of the expanded felly with the rim.

With the actuator rotated to a position in which one of the apices of the wrench receiving head 27 is alined with the index mark 38, the ball 33 is forced into one of the pockets 32 by rotating the screw 35 so as to lock the actuator against unscrewing movement and thus positively maintain the felly expanded. The nut 45 is now rotated on the stud 43 to seat in the enlarged portion 42 of the slot 41 so that the nut and the valve stem V will co-operate to prevent displacement of the rim from the wheel should the operator fail to expand the felly to a maximum extent against the rim, or should the felly contract for any reason so as to fail to firmly grip the rim, thus insuring that the rim will not become detached from the wheel when in use.

To remove the rim from the wheel, it will be clear that the above described operation is reversed in order to contract the felly to the position shown in Figure 2, and that when the nut 45 has been rotated on the stud 43 sufficiently to clear the felly as also shown in Figure 2, the rim can be readily removed from the wheel.

It will be manifest that in practice the actual amount of expansion and contraction of the felly necessary for the felly to firmly grip or release the rim for the removal of the latter, is very slight so that the actual flexing of the spokes 18 and 19 is negligible and is effected without fracturing or injury to their permanent connections with the felly sections and hub members.

Although we have herein shown and described only one form of vehicle wheel embodying our invention, it is to be understood that various changes and modifications may be made therein without departing from the spirit of the invention and the spirit and scope of the appended claim.

We claim:

A vehicle wheel comprising a radially expansible and contractible felly, a pair of relatively movable hub members, means for relatively moving the hub members oppositely with respect to each other, and means for so supporting the felly from the hub members that expansion or contraction of the felly will be effected according as the hub members are relatively moved towards or away from each other, the last means comprising flexible spokes, certain of which are rigidly secured to the felly and one of the hub members, and others of which are rigidly secured to the felly and the other of the hub members.

EDWARD E. KELLOGG.
ALBERT T. SMITH.